(12) United States Patent
Neumann et al.

(10) Patent No.: US 8,209,625 B2
(45) Date of Patent: Jun. 26, 2012

(54) PHRASE-DRIVEN GRAMMAR FOR DATA VISUALIZATION

(75) Inventors: Ulrich Neumann, Manhattan Beach, CA (US); Sang Yun Lee, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 581 days.

(21) Appl. No.: 12/483,567

(22) Filed: Jun. 12, 2009

(65) Prior Publication Data

US 2009/0313576 A1 Dec. 17, 2009

Related U.S. Application Data

(60) Provisional application No. 61/061,077, filed on Jun. 12, 2008.

(51) Int. Cl.
*G06F 3/048* (2006.01)
(52) U.S. Cl. ........ 715/781; 715/764; 715/766; 715/780; 715/783
(58) Field of Classification Search .................. 715/764, 715/766, 780, 781, 783
See application file for complete search history.

(56) References Cited

U.S. PATENT DOCUMENTS

| | | | | |
|---|---|---|---|---|
| 5,838,906 | A * | 11/1998 | Doyle et al. .................. | 715/205 |
| 7,103,854 | B2 * | 9/2006 | Fuchs et al. .................. | 715/855 |
| 7,137,076 | B2 * | 11/2006 | Iwema et al. .................. | 715/863 |
| 7,191,326 | B2 * | 3/2007 | Louden et al. .................. | 713/1 |
| 7,632,101 | B2 * | 12/2009 | Braunberger et al. ........ | 434/322 |
| 8,117,225 | B1 * | 2/2012 | Zilka .............................. | 707/769 |
| 2002/0072896 | A1 * | 6/2002 | Roberge et al. ................. | 704/10 |
| 2003/0077559 | A1 * | 4/2003 | Braunberger et al. ........ | 434/322 |
| 2004/0021700 | A1 * | 2/2004 | Iwema et al. .................. | 345/863 |
| 2006/0109267 | A1 * | 5/2006 | Rybacki et al. ............... | 345/423 |
| 2009/0094674 | A1 * | 4/2009 | Schwartz et al. .................. | 726/1 |
| 2009/0204386 | A1 * | 8/2009 | Seligman et al. .................. | 704/2 |
| 2010/0225644 | A1 * | 9/2010 | Swope et al. .................. | 345/419 |

OTHER PUBLICATIONS

Lee, S.Y. et al. A Phrase-Driven Grammar System for Interactive Data Visualization. Visualization and Data Analysis 2008, SPIE vol. 6809, pp. 68090K-1 thru 68090K-12.
Ahlberg, C. Spotfire: An Information Exploration Environment. ACM SIGMOD Record, 25(4):25-29, 1996.
Androutsopoulos, L. et al. Natural language interfaces to databases—an introduction. Journal of Natural Language Engineering, 1:50, 1995.
Cha, S.K. Kaleidoscope: A Model-Based Grammar-Driven Menu Interface for Databases. PhD thesis, Stanford, CA, USA, pp. ii-127, 1991.
Cha, S.K. Kaleidoscope: A Cooperative Menu-Guided Query Interface (SQL Version). IEEE Transactions on Knowledge and Data Engineering, vol. 3, No. 1, pp. 42-45, Mar. 1991.
Codd, E.F. A Relational Model of Data for Large Sharers Data Banks. Communications of the ACM, 13(6):377-387, 1970.

(Continued)

*Primary Examiner* — Weilun Lo
*Assistant Examiner* — Shashi Becker
(74) *Attorney, Agent, or Firm* — Pillsbury Winthrop Shaw Pittman LLP (57) ABSTRACT

A data visualization system may allow an untrained user to easily, rapidly, and unambiguously specify the content and format of a report about information. A user interface may present to a user and receive from the user a selection of a plurality of selectable visualization types, selectable data objects, and selectable data specifications. The user interface may display all of the selections which the user makes as a single composite phrase.

21 Claims, 5 Drawing Sheets

OTHER PUBLICATIONS

Fails, J.A. et al. A Visual Interface for Multivariate Temporal Data: Finding Patterns of Events across Multiple Histories. Visual Analytics Science and Technology, 2006 IEEE Symposium On, pp. 167-174, 2006.

Tennant, H.R. et al. Menubased natural language understanding. Proceedings of the 21st conference on Association for Computational Linguistics, pp. 629-635, 1983.

Welty, C. et al. Human Factors Comparison of a Procedural and a Nonprocedural Query Language. ACM Trans. Database Syst., 6(4):626-649, 1981.

Zloof. M.M. Query-by-Example: The Invocation and Definition of Tables and Forms. IBM Journal of Research and Development, pp. 1-24, 1977.

Zloof, M.M. QBE/OBE: A Language for Office and Business Automation. Computer, 14(5):13-22, 1981.

* cited by examiner

Phrase Development
Show me a [viz_type]
Show me a [2D plot] for [object(s)]
Show me a [2d plot] for [selected wells] of [data]
Show me a [2D plot] for [selected wells] of [well_id] vs [data]
Show me a [2D plot] for [selected wells] of [well_id] vs_[pressure]_[do it]

FIG. 3

Phrase Variations
Show me a [2D plot] for [selected wells] of [well_id] vs_[pressure]_[do it]
Show me a [2D plot] for [selected wells] of [well_id] vs [avg] [pressure]
    [over the last 30 days] [do it]
Show me a [2D plot] for [selected wells] of [well_id] vs [maximum]
    [pressure] [over last 30 days] [do it]

Other Phrase Examples
Show me a [2D plot] for [selected tanks] of [avg] [inflow] vs [avg] [outflow] over the last 5 days] [do it]
Show me a [treemap] for [selected wells]of [cumulative] [production] [over the last 6 months] [do it]
Show me a [2D time series] for [selected wells] of [production] vs [pressure] from 1/04 to 3/05] [do it]
Show me a [map] for [selected wells] of [cumulative] [production] vs [avg] [pressure] vs [peak] [temperature] [over the last 3 months] [do it]
Show me [steam production] for [selected wells] [do it]
Show me a [map] for [selected wells] of [cumulative] [maintenance cost] vs [peak] [production] [over the last 6 months] [do it]

Fig. 15

PHRASE-DRIVEN GRAMMAR FOR DATA VISUALIZATION

CROSS-REFERENCE TO RELATED APPLICATION(S)

This application is based upon and claims priority to U.S. Provisional Patent Application No. 61/061,077, entitled "PHRASE-DRIVEN GRAMMAR FOR DATA VISUALIZATION," filed Jun. 12, 2008, the entire content of which is incorporated herein by reference.

BACKGROUND

1. Technical Field

This disclosure relates to data analysis and visualization tools.

2. Description of Related Art

Data analysis and visualization tools may be used to mine data for information. These tools may be powerful, but may be difficult to learn and use. Their flexibility may also be limited.

"Natural language" interfaces have been developed instead. However, they may result in the formulation of data queries which do not effectively target the data that is of interest.

Whether using structured or natural language, it may also be challenging for users to present the results of the query in a way that meets the needs of the user. Available visualization systems may lack flexibility and may also be incompatible or difficult to interface with the data query system.

SUMMARY

A data visualization system may allow an untrained user to easily, rapidly, and unambiguously specify the content and format of a report about information. The data visualization system may include a computer processing system which may include a display configured to provide a user interface.

The user interface may present a plurality of selectable visualization types to the user. Each selectable visualization type may specify a way in which data may be visually presented to the user. The presentation may be in a format that allows the user to select at least one of the visualization types from the plurality of visualization types. The user interface may receive a selection of at least one of the visualization types from the user.

The user interface may present a plurality of selectable data objects to the user. Each selectable data object may be associated with data. The presentation may be in a format that allows the user to select at least one of the data objects from the plurality of data objects. The user interface may receive a selection of at least one of the data objects from the user.

The user interface may present a plurality of selectable data specifications to the user. Each selectable data specification may specify a portion of data within at least one of the data objects which the user has selected. The presentation may be in a format that allows the user to select at least one of the data specifications from the plurality of data specifications. The user interface may receive a selection of at least one of the data specifications from the user.

The user interface may display all of the selections which the user makes of the visualization types, data objects, and data specifications as a single composite phrase.

The selectable visualization types may include both two dimensional and three dimensional visualization types.

The selectable visualization types may have a range of diversity which requires a plurality of different types of data visualization application programs to render them all.

The computer processing system may be configured to deliver data to each of the plurality of data visualization application programs. The computer processing system may be configured to deliver the portion of the data which the user selects though the user's selection of the at least one data object and the at least one data specification to the data visualization application program in the way specified by the user's selection of at least one of the visualization types.

The format in which the user interface presents the selectable visualization types may include a menu.

At least one of the data objects may be in a database which employs an access method different from a database in which at least one of the other data objects resides.

The format in which the user interface presents the selectable data objects and/or selectable data specifications may include a menu and/or a map.

The selectable data specifications may include a selection of one or more fields within a record and/or data filters.

The computer processing system may be configured to provide a user interface which presents a plurality of selectable data operations to the user. Each selectable data operation may specify an operation which is to be performed on the portion of data which is specified by the user's election of the at least one data specification. The presentation may be in a format that allows the user to select at least one of the data operations from the plurality of data operations. The computer processing system may be configured to receive a selection of at least one of the data operations from the user and display all of the selections which the user makes of the visualization types, data objects, data specifications, and data operations as a single composite selection.

The selectable data operations may include one or more data aggregate functions.

The computer processing system may be configured to cause the user interface to update the display of all of the selections which the user makes of the visualization types, data objects, and data specifications contemporaneously with each selection the user makes.

The computer processing system may be configured to cause the user interface to present the selectable visualization types, selectable data objects, and selectable data specifications in this order.

The single composite phrase may effectively communicate the selections which the user has made in conformance with the semantics of a spoken language. The spoken language may be English. The single composite phrase may conform to the grammatical structure of the spoken language.

A data visualization method may allow an untrained user to easily, rapidly, and unambiguously specify the content and format of a report about information. The data visualization method may include making each of the presentations, receiving each of the selections, and displaying each of the selections as described above using a user interface of a computer system having a display.

Computer-readable storage media may contain computer-readable instructions configured to cause a computer system having a display to make each of the presentations, receive each of the selections, and display each of the selections described above.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
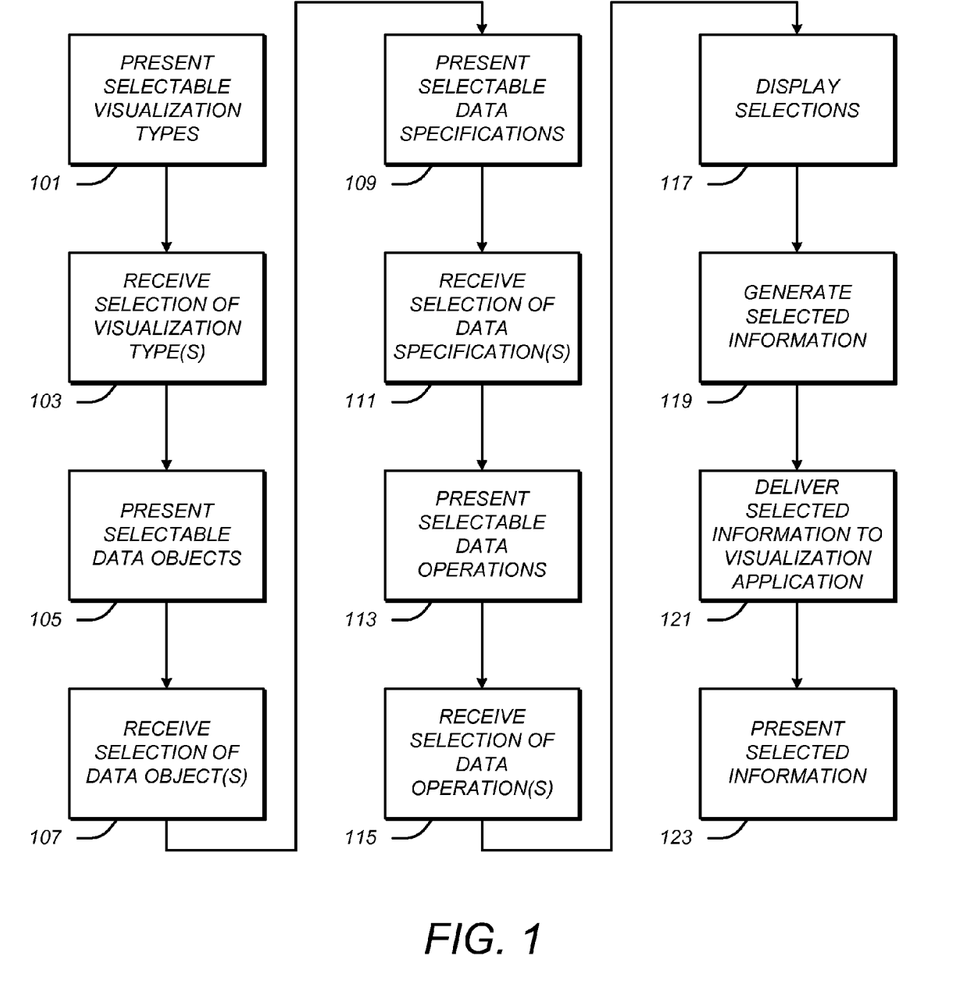
FIG. 1 is a flow diagram of a data visualization method.

FIG. 1 is a flow diagram of a data visualization method. The data visualization method illustrated in FIG. 1 may allow an untrained user to easily, rapidly, and unambiguously specify both the content and format of a report about information. The method may do so by presenting various selections to the user, receiving the selections, and displaying the selections which the user makes as a single composite phrase. The single composite phrase may be delivered to a data visual application program so that it may be presented to the user.

Figure 2:
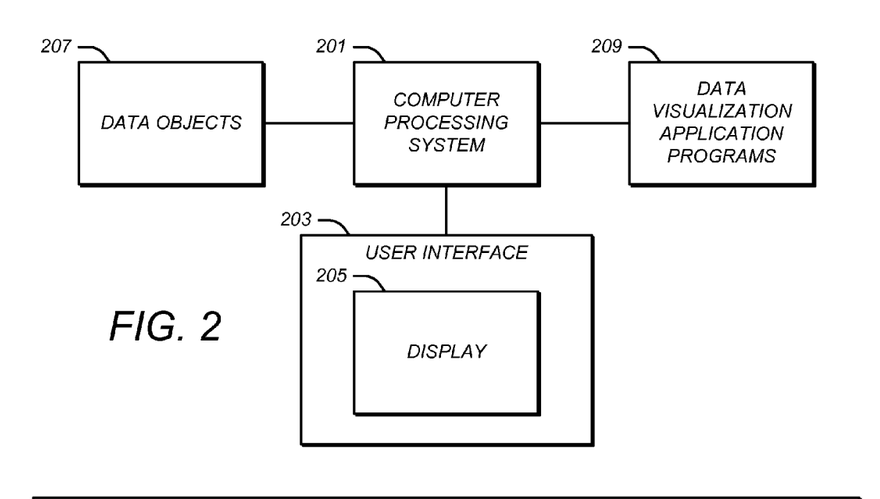
FIG. 2 illustrates a data visualization system utilizing a computer processing system and a display.

FIG. 2 illustrates a data visualization system utilizing a computer processing system and a display. The data visualization system may be configured to implement the data visualization method of FIG. 1 as well as other methods. The data visualization method of FIG. 1 may also be implemented with a data visualization system other than the one illustrated in FIG. 2.

As illustrated in FIG. 2, the data visualization system may include a computer processing system 201. The computer processing system 201 may include a user interface 203, which may include a display 205, as well as any other type of user interface device, such as one or more other displays, and one or more keyboards, mice, touch screens, sound systems, and/or microphones. The data visualization system may also include data objects 207 and data visualization application programs 209.

The user interface 203 may present a plurality of selectable visualization types to the user, as illustrated in a Present Selectable Visualization Types step 101. Each visualization type may specify a way in which data may be visually presented to the user. The visualization types may include both one-dimensional, two-dimensional, and/or three-dimensional visualization types. The visualization types may have a wide range of diversity. The capabilities for rendering such a diverse array of visualization types may in whole or in part be embedded within the interface 203. The range of diversity may in whole or in part instead require a plurality of different types of external data visualization application programs 209 to render them all. These may include, for example, I-Decide, Spotfire, Esri ArcInfo, ArcView, ArcIMS, ArcMap, GoCad, Wonderware, Map Connect, Sloop2, MS-Excel, Map Connect, and/or GOCAD.

The user interface 203 may present the visualization types to the user in any manner. The presentation may be in a format that allows the user to select at least one of the visualization types from the plurality of visualization types. For example, the user interface may be configured to present the visualization types in a drop-down menu, a scroll menu, and/or as a set of graphic icons.

The user interface 203 may be configured to receive a selection of at least one of the visualization types from the user, as reflected by a Receive Selection of Visualization Type(s) step 103. During this step, the user may use any means to communicate selection(s), such as a mouse, keyboard, microphone, touch screen, and/or any other type of user interface device.

The user interface 203 may present a plurality of selectable data objects 207 to the user, as reflected by a Present Selectable Data Objects step 105. Each of the data objects 207 may be associated with data. That data may or may not be within the data object. The data may be of any type and in any form.

At least one of the data objects 207 may be in a database which employs an access method different from a database in which at least one of the other data objects 207 resides. For example, the data objects 207 may include data objects from two or more of the following types of databases: relational databases, time-series data storage, and index-able data tables. Examples of commercially-available versions include MS-Excel, Oracle, mySQL, MS-SQL, and MS-Access. Each database may be managed by a correspondingly different type of database management system.

The user interface 203 may present the data objects 207 to the user in any form. The presentation may be in a format that allows the user to select at least one of the data objects 207 from the entire set of data objects 207. For example, the user interface 203 may present the data objects using a drop-down menu, a scroll menu, a hierarchical menu, and/or a set of graphic icons. When using one of these approaches, the user interface 203 may communicate each of the data objects 207 by a name which is different from the names of all of the other data objects 207.

The user interface 203 may in addition or instead present the data objects 207 in the form of a map. The user interface 203 may be configured to allow the user to select one or more geographic areas of interest that are located on the map. This may cause the selection of the data objects 207 that are located within that geographic area. Such a configuration may be useful in those situations in which at least some of the data objects 207 are associated with geographic locations.

The data objects 207 which are offered to the user for selection by the user interface 203 may be limited to those data objects which are appropriate in view of other selections which the user may have already made, such as the visualization type(s) which the user has selected.

The user interface 203 may be configured to receive a selection of at least one of the data objects from the user, as reflected by a Receive Selection of Data Object(s) step 107.

The user interface 203 may be configured to present a plurality of selectable data specifications to the user, as reflected by a Present Selectable Data Specification(s) step 109. Each data specification may specify a portion of data within the data object(s) which the user has selected. For example, the data specifications may include a selection of one or more fields within one or more records and/or one or more data filters to be applied to the selected data objects.

The user interface 203 may present the selectable data specifications in any format. The presentation may be in a format that allows the user to select at least one of the data specifications from the data specifications. For example, the user interface 203 may present the selectable data specifications as a pull-down menu, a scroll menu, a hierarchical menu, and/or as a set of graphic icons. When using one or more of these approaches, each selectable data specification may be specified by a unique name.

The user interface may be configured to present the selectable data specifications in the form of a map. In this configuration, one or more of the selectable data specifications may be representative of a location. The user may select one or more of these data specifications by selecting one or more locations on the map.

The data specifications which are offered by the user interface for selection may be limited to those that are appropriate in view of other selections which the user has made, such as selections of visualization types and/or data objects 207.

The user interface 203 may be configured to receive a selection of at least one of the selectable data specifications from the user, as reflected by a Receive Selection of Data Specification(s) step 111.

The user interface 203 may be configured to present a plurality of selectable data operations to the user, as reflected by a Present Selectable Data Operations step 113. Each selectable data operation may specify an operation which is to be performed on the portion of data which is specified by the user's selection of at least one data specification.

The user interface 203 may present the selectable data operations in any format. The presentation may be in a format that allows the user to select at least one of the selectable data operations from the plurality of selectable data operations. For example, the user interface may present the selectable data operations through a pull-down menu, a scroll menu, a hierarchical menu, and/or through a set of graphic icons.

The selectable data operations may be of any type. For example, the selectable data operations may include one or more data aggregate functions, such as the data aggregate functions of maximum, minimum, average, rate of an attribute, and/or cumulative.

The user interface 203 may be configured to limit the data operations which are presented to those which are appropriate in view of other selections which the user may have already made, such as selections of visualization types, data objects 207, and/or data specifications.

The user interface 203 may be configured to receive a selection of at least one of the selectable data operations from the user, as reflected by a Receive Selection of Data Operation(s) step 115.

The user interface 203 may be configured to display all of the selections which the user makes, such as the selections of selectable visualization types, selectable data objects 207, selectable data specifications, and/or selectable data operations, as reflected by a Display Selections step 117. The user interface 203 may be configured to display these selections as a single composite phrase.

The user interface 203 may be configured to update the display of all or some of the selections which the user makes of the selectable visualization type, selectable data objects, selectable data specifications, and selectable data operations contemporaneously with when the user makes each selection, rather than waiting until the Display Selections step 117.

The single composite phrase may effectively communicate the selections which the user has made in conformance with the semantics of a spoken language, such as in conformance with the semantics of the English, French, German, Chinese, Japanese, and/or Russian language. The single composite phrase may conform to the grammatical structure of the spoken language.

The computer processing system 201 may be configured to cause the user interface 203 to present the selections described above, to receive the selections described above, to display the selections described above, to present other selections, to receive other selections, to display other selections, and/or to provide the other functionality which is discussed herein. To accomplish this, the computer processing system may include one or more computer processing devices, one or more computer memories, one or more computer storage devices, and appropriate interconnection technology. The computer processing system 201 may include one or more software programs, including one or more operating systems and application programs. One or more of the software programs may contain one or more algorithms configured to implement each of the functions which have been described herein that are performed by the computer processing system 201, including the user interface 203. Each of these algorithms may be written in accordance with standard computer programming techniques.

The computer processing system may be configured to query the data objects 207 which the user has selected for the information specified by the data specifications which the user has selected, all as set forth in the composite data specification, as reflected by a Generate Selected Information step 119. In the event that the selected data objects 207 are being managed by other database management systems, the computer processing system may be configured to cause the other database management systems to appropriately query the selected data objects and to receive the requested information in return.

The computer processing system 201 may be configured to deliver data to each of the plurality of data visualization application programs 209, so as to cause each of the data visualization application programs 209 to display the data in one or more of the ways provided by the data visualization application program. The computer processing system may be configured to route the data which is returned following the Generate Selected Information step 119 to the data visual application programs which present the data to the user in the ways specified by the visualization types selected by the user. This is reflected by a Deliver Selected Information to Visualization Application step 121. The data visual application program to which the information has been directed may present the selected information to the user in at least one of the way selected by the user, as reflected by a Present Selected Information step 123.

Computer-readable storage media may contain computer-readable instructions. These instructions may be configured to cause a computer processing system having a display to perform each of the presentations, receive each of the selections, display each of the selections, and to otherwise perform the functions of the computer processing system 201 described above. The computer-readable storage media may include one or more CD's, DVD's, flash memories, hard drives, and/or ROMS.

The steps which have been described above in connection with FIG. 1 may proceed in the sequence in which they have been described or in a different sequence. For example, the presentation and receipt of visualization type(s) may take place after data objects, data specifications, and/or data operations have been selected.

Figure 3:
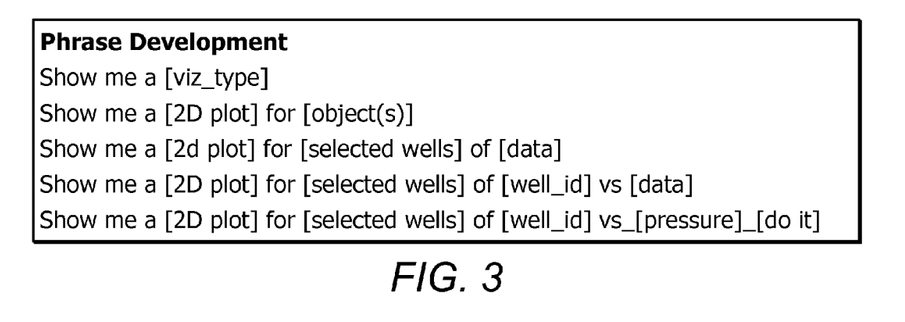
FIG. 3 illustrates sequential selections which a user may make while constructing a single composite phrase using a data visualization system.

FIG. 3 illustrates sequential selections which a user may make while constructing a single composite phrase using a data visualization system. As illustrated in FIG. 3, the single composite phrase may have the general structure of "Show me a [visualization type] for [data objects] of [data specifications] . . . " FIG. 3 illustrates the development of this form of a single composite phrase after each portion of it has been selected by a user. Other forms for the single composite phrase may be provided in addition or instead.

Figure 4:
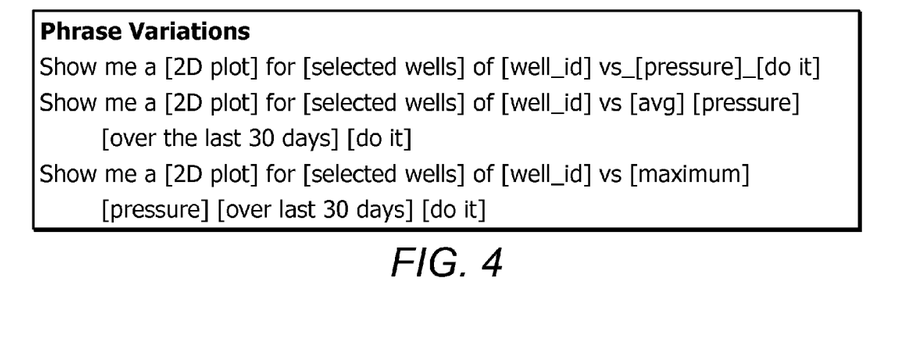
FIG. 4 illustrates variations which may be selected while constructing a single composite phrase using a data visualization system, such as modifiers which a user may select.

FIG. 4 illustrates variations which may be selected while constructing a single composite phrase using a data visualization system, such as modifiers which a user may select. As illustrated in FIG. 4, one or more modifiers may be added to the single composite phrase to refine one or more of its components.

Figure 5:
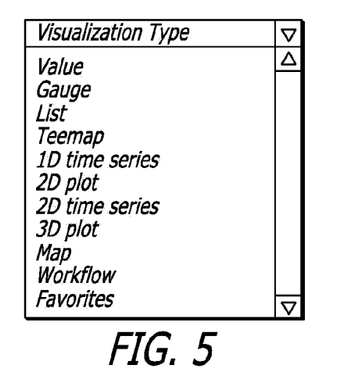
FIG. 5 illustrates a pull-down menu which may be presented to a user in a data visualization system to enable the user to select at least one visualization type.

FIG. 5 illustrates a pull-down menu which may be presented to a user in a data visualization system to enable the user to select at least one visualization type. Different menu entries may be associated with different types of data visualization application programs 209. Visualization types which have been used in the past may be stored for easy recall in a "Favorites" section, as reflected by a "Favorites" menu entry in FIG. 5.

Figure 6:
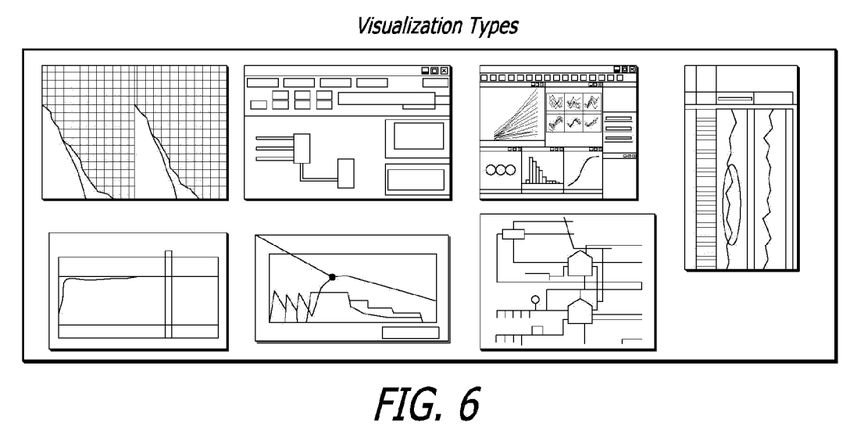
FIG. 6 illustrates graphic icons which may be presented to a user in a data visualization system to enable the user to select at least one visualization type.

FIG. 6 illustrates graphic icons which may be presented to a user in a data visualization system to enable the user to select at least one visualization type. Each graphic icon may be representative of a way in which data may be visually presented. The user may select a visualization type by selecting one of these icons. The presentation of graphic icons for the user to select may be provided instead of a text menu, such as illustrated in FIG. 5, or in addition to such a text menu.

Figure 7:
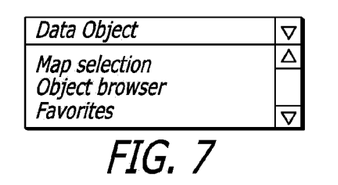
FIG. 7 illustrates a pull-down menu which may be presented to a user in a data visualization system to enable the user to select an interface format for selecting at least one data object.

FIG. 7 illustrates a pull-down menu which may be presented to a user in a data visualization system to enable the user to select an interface format for selecting at least one data object. Interface formats which have been used in the past may be stored for easy recall in a "Favorites" section, as reflected by a "Favorites" menu entry in FIG. 7. Alternately, interfaces formats may be displayed concurrently, allowing the user to simply make a data object selection in any of the formats.

Figure 8:
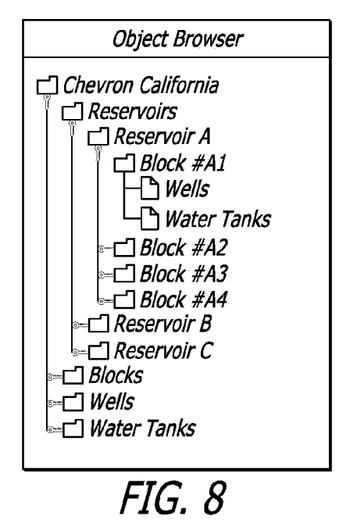
FIG. 8 illustrates a scroll menu which may be presented to a user in a data visualization system to enable the user to select at least one data object.

FIG. 8 illustrates a scroll menu which may be presented to a user in a data visualization system to enable the user to select at least one data object. The object browser which is illustrated in FIG. 8 may be displayed to the user in response to selection of "Object Browser" in the pull-down menu illustrated in FIG. 7.

Figure 9:
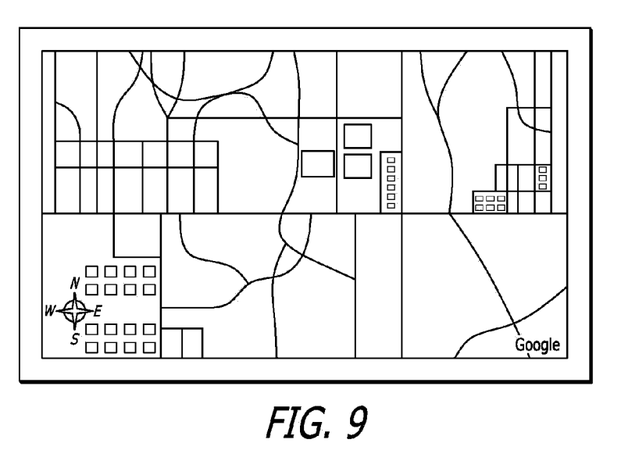
FIG. 9 illustrates a map which may be presented to a user in a data visualization system to enable the user to select at least one data object.

FIG. 9 illustrates a map which may be presented to a user in a data visualization system to enable the user to select at least one data object. The map which is illustrated in FIG. 9 may be presented to a user in response to selection of "Map Selection" in the pull-down menu illustrated in FIG. 7. The map which is illustrated in FIG. 9 may enable a user to select at least one of the data objects 207 by selecting one or more graphical icons or areas or objects that are illustrated on the map. At least some of the data objects 207 may each be associated with a geographic location. For example, some of the data objects may each represent a set of data about an oil well at a particular geographic location.

Figure 10:
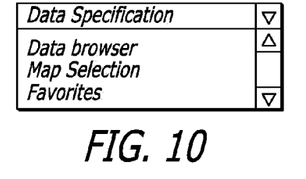
FIG. 10 illustrates a pull-down menu which may be presented to a user in a data visualization system to enable the user to select an interface format for selecting at least one data specification.

FIG. 10 illustrates a pull-down menu which may be presented to a user in a data visualization system to enable the user to select an interface format for selecting at least one data specification. Interface formats which have been used in the past may be stored for easy recall in a "Favorites" section, as reflected by a "Favorites" menu entry in FIG. 10.

Figure 11:
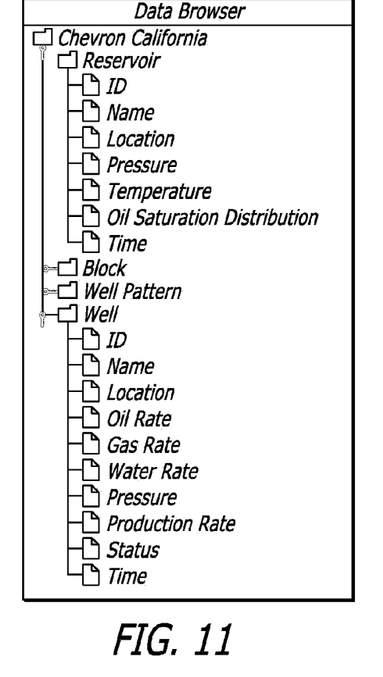
FIG. 11 illustrates a scroll menu which may be presented to a user in a data visualization system to enable the user to select at least one data specification.

FIG. 11 illustrates a scroll menu which may be presented to a user in a data visualization system to enable the user to select at least one data specification. The data browser which is illustrated in FIG. 11 may be displayed to a user in response to selection of the "Data Browser" menu entry which is illustrated in FIG. 10.

One or more of the data specifications may be associated with a geographic location. For example, one of the data objects 207 may contain data about a set of oil wells which are being drilled by a company. The data specification, in turn, may specify only a subset of these wells within a particular geographic location. A map, such as is illustrated in FIG. 9, may be used to facilitate the selection of such a data specification. The pull-down menu which is illustrated in FIG. 10 may therefore include a selection such as a "Map Selection."

Figure 12:
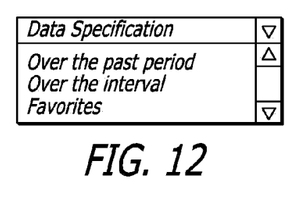
FIG. 12 illustrates a pull-down menu which may be presented to a user in a data visualization system to enable the user to select at least one type of data specification.

FIG. 12 illustrates a pull-down menu which may be presented to a user in a data visualization system to enable the user to select other types of data specification. As illustrated in FIG. 12, this may include a data specification which restricts the data to a particular period of time, such as data within a past number of minutes, hours, days, weeks, months, or years. The period of time may be requested and provided after the selection of the "over the past period" menu entry. Similarly, the data may be restricted to data which concerns a particular time interval. Data specifications which have been used in the past may also be stored for easy recall in a "Favorites" section, as reflected by a "Favorites" menu entry in FIG. 12.

Figure 13:
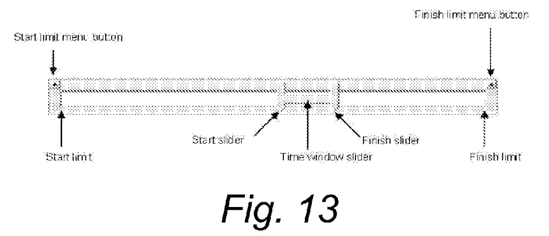
FIG. 13 illustrates a graphic time line which may be presented to a user in a data visualization system to enable the user to select a data specification that includes an interval.

FIG. 13 illustrates a graphic time line which may be presented to a user in a data visualization system to enable the user to select a data specification that includes an interval. Such a time line may be presented in response to a user selecting the "Over the Interval" menu entry in FIG. 12.

Figure 14:
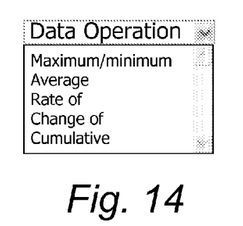
FIG. 14 illustrates a pull-down menu which may be presented to a user in a data visualization system to enable the user to select at least one type of data operation.

FIG. 14 illustrates a pull-down menu which may be presented to a user in a data visualization system to enable the user to select at least one type of data operation. Each data operation may specify an operation which is to be performed on data which results from the selected data object 207 and data specifications. The selectable data operations may include, for example, computing a maximum, a minimum, an average, a rate, or a total may be selected, as illustrated in FIG. 14.

Figure 15:
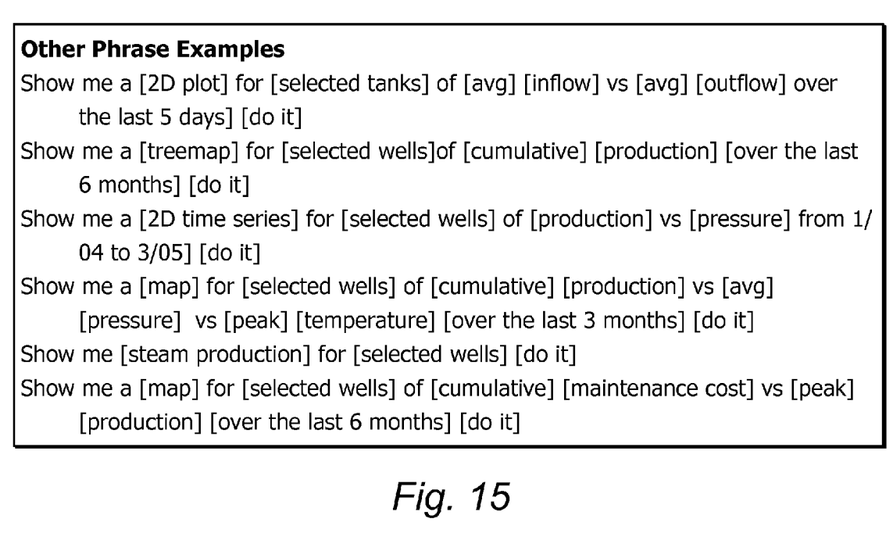
FIG. 15 illustrates other examples of single composite phrases which a user may construct using a data visualization system.

FIG. 15 illustrates other examples of single composite phrases which a user may construct using a data visualization system. These are merely further examples of the wide variety of phrases which may be constructed.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, one or more of the menu systems which have been discussed may be configured to present a hierarchy of choices to make the selection process easier. Menu options may be constrained based on prior phrase selections such that only meaningful and executable phrases can be constructed. In addition, phrases may be stored as a file and recalled from a file and/or copied and pasted as part of messages or documents.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. A data visualization system for allowing an untrained user to easily, rapidly, and unambiguously specify the content and format of a report about information, the data visualization system comprising a computer processing system, including a display, configured to provide a user interface which:

presents a plurality of selectable visualization types to the user, each selectable visualization type specifying a way in which data may be visually presented to the user, the presentation being in a format that allows the user to select at least one of the visualization types from the plurality of visualization types;

receives a selection of at least one of the visualization types from the user;

presents a plurality of selectable data objects to the user, each selectable data object being associated with data, the presentation being in a format that allows the user to select at least one of the data objects from the plurality of data objects;

receives a selection of at least one of the data objects from the user;

presents a plurality of selectable data specifications to the user, each selectable data specification specifying a portion of data within the at least one of the data objects which the user has selected, the presentation being in a format that allows the user to select at least one of the data specifications from the plurality of data specifications;

receives a selection of at least one of the data specifications from the user; and displays all of the selections which the user makes of the visualization types, data objects, and data specifications as a single composite phrase.

2. The data visualization system of claim 1 wherein the selectable visualization types include both two dimensional and three dimensional visualization types.

3. The data visualization system of claim 1 wherein the selectable visualization types have a range of diversity which requires a plurality of different types of data visualization application programs to render them all.

4. The data visualization system of claim 3 wherein the computer processing system is configured to:

deliver data for presenting to the user to each of the plurality of data visualization application programs; and deliver the portion of the data which the user selects though the user's selection of at least one data object and the at least one data specification to the data visualization application program which presents the data to the user in the way specified by the user's selection of at least one of the visualization types.

5. The data visualization system of claim 1 wherein the format in which the user interface presents the selectable visualization types includes a menu.

6. The data visualization system of claim 1 wherein at least one of the selectable data objects is in a database which employs an access method different from a database in which at least one of the other selectable data objects resides.

7. The data visualization system of claim 1 wherein the format in which the user interface presents the selectable data objects includes a menu.

8. The data visualization system of claim 1 wherein the format in which the user interface presents the selectable data objects includes a map.

9. The data visualization system of claim 1 wherein the format in which the user interface presents the selectable data specifications includes a menu.

10. The data visualization system of claim 1 wherein the format in which the user interface presents the selectable data specifications includes a map.

11. The data visualization system of claim 1 wherein the selectable data specifications include a selection of one or more fields within a record.

12. The data visualization system of claim 1 wherein the selectable data specifications include a selection of one or more data filters.

13. The data visualization system of claim 1 wherein the computer processing system is configured to provide a user interface which:
- presents a plurality of selectable data operations to the user, each selectable data operation specifying an operation which is to be performed on the portion of data which is specified by the user's selection of the at least one data specification, the presentation being in a format that allows the user to select at least one of the data operations from the plurality of data operations;
- receives a selection of at least one of the data operations from the user; and
- displays all of the selections which the user makes of the visualization types, data objects, data specifications, and data operations as a single composite selection.

14. The data visualization system of claim 13 wherein the selectable data operations include one or more data aggregate functions.

15. The data visualization system of claim 1 wherein the computer processing system is configured to cause the user interface to update the display all of the selections which the user makes of the visualization types, data objects, and data specifications contemporaneously with each selection the user makes.

16. The data visualization system of claim 1 wherein the computer processing system is configured to cause the user interface to present the visualization types, data objects, and data specifications in the order in which they are recited in claim 1.

17. The data visualization system of claim 1 wherein the single composite phrase effectively communicates the selections which the user has made in conformance with the semantics of a spoken language.

18. The data visualization system of claim 17 in which the spoken language is English.

19. The data visualization system of claim 17 in which the single composite phrase conforms to the grammatical structure of the spoken language.

20. A data visualization method for allowing an untrained user to easily, rapidly, and unambiguously specify the content and format of a report about information, the data visualization method comprising making each of the presentations, receiving each of the selections, and displaying each of the selections specified in claim 1 using a user interface of a computer system having a display.

21. Computer readable storage media containing computer-readable instructions configured to cause a computer system having a display to perform each of the presentations, receive each of the selections, and display each of the selections specified in claim 1.

* * * * *